(12) United States Patent
Kåll et al.

(10) Patent No.: US 8,374,631 B2
(45) Date of Patent: Feb. 12, 2013

(54) PROVISION OF LOCATION INFORMATION IN A COMMUNICATION SYSTEM

(75) Inventors: Jan Kåll, Espoo (FI); Roman Pichna, Espoo (FI); Kalle Ahmavaara, Helsinki (FI); Jens Staack, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 13 days.

(21) Appl. No.: 10/342,325

(22) Filed: Jan. 15, 2003

(65) Prior Publication Data

US 2004/0203914 A1    Oct. 14, 2004

(51) Int. Cl.
*H04Q 7/20*    (2006.01)

(52) U.S. Cl. ........... 455/456.2; 455/456.1; 455/456.3; 455/432; 455/517; 455/560; 455/426; 455/433; 455/435; 370/338; 370/328; 370/355; 370/493; 370/389; 370/351; 370/401

(58) Field of Classification Search ........... 455/456.1, 455/456.2, 456.3, 426.1, 454, 448, 404.2, 455/414.1, 456, 457, 422, 524, 433, 435, 455/404, 439, 411; 370/331, 229, 338, 352, 370/467, 328, 355, 493, 349, 389, 401, 351; 379/130

See application file for complete search history.

(56) References Cited

U.S. PATENT DOCUMENTS

| | | | |
|---|---|---|---|
| 5,905,961 A * | 5/1999 | Sanders et al. | 455/456.2 |
| 6,332,077 B1 | 12/2001 | Wu et al. | |
| 6,463,288 B1 | 10/2002 | Havinis et al. | |
| 6,477,379 B2 * | 11/2002 | Kingdon | 455/456.1 |
| 6,954,657 B2 * | 10/2005 | Bork et al. | 455/567 |
| 6,993,335 B2 * | 1/2006 | Natarajan et al. | 455/437 |

(Continued)

FOREIGN PATENT DOCUMENTS

| | | |
|---|---|---|
| EP | 1 158 826 A2 | 11/2001 |
| WO | WO 00/76171 A1 | 12/2000 |

(Continued)

OTHER PUBLICATIONS

European Office Action for related European Patent Application No. 04 701 966.6-2416 dated Dec. 13, 2011, pp. 1-5.

(Continued)

*Primary Examiner* — Patrick Edouard
*Assistant Examiner* — Fred Casca
(74) *Attorney, Agent, or Firm* — Ditthavong Mori & Steiner, P.C.

(57) ABSTRACT

The invention relates to a mechanism for providing location information regarding mobile terminals, especially regarding WLAN terminals. In order that the known mechanism for locating users of a mobile cellular network could be utilized for locating WLAN terminals, a location service request concerning a WLAN terminal is received and routed by the same network elements that receive and route location service requests concerning users of a mobile cellular network. However, in the case of a WLAN terminal the location service request is diverted to a predetermined network element, where the access point currently serving the WLAN terminal is identified. The location information corresponding to the said access point is then determined, and the location information is returned as the location of the terminal. The location of the serving WLAN access point thus represents the location of the WLAN terminal.

29 Claims, 5 Drawing Sheets

U.S. PATENT DOCUMENTS

| | | | |
|---|---|---|---|
| 7,054,627 B1 * | 5/2006 | Hillman | 455/422.1 |
| 7,310,307 B1 * | 12/2007 | Das et al. | 370/229 |
| 2002/0147008 A1 * | 10/2002 | Kallio | 455/426 |
| 2003/0027575 A1 * | 2/2003 | Hasegawa et al. | 455/435 |
| 2003/0155413 A1 * | 8/2003 | Kovesdi et al. | 235/375 |
| 2004/0008645 A1 * | 1/2004 | Janevski et al. | 370/331 |
| 2004/0028017 A1 * | 2/2004 | Whitehill et al. | 370/338 |
| 2004/0090937 A1 * | 5/2004 | Chaskar et al. | 370/331 |
| 2005/0003829 A1 * | 1/2005 | Lala et al. | 455/456.1 |

FOREIGN PATENT DOCUMENTS

| | | |
|---|---|---|
| WO | WO 02/054814 A1 | 7/2002 |

OTHER PUBLICATIONS

European Office action for corresponding EP application No. 04 701 966.6-2416 dated Apr. 28, 2011, pp. 1-6.

\* cited by examiner

PROVISION OF LOCATION INFORMATION IN A COMMUNICATION SYSTEM

FIELD OF THE INVENTION

The invention relates generally to the location services provided in a communication system. More particularly, the invention relates to the provision of location information concerning a mobile terminal provided with WLAN (Wireless Local Area Network) capabilities. In other words, the mobile terminal to be located is a WLAN terminal which may be a WLAN only terminal or a so-called multimode terminal that is, additionally, capable of accessing a cellular mobile network.

BACKGROUND OF THE INVENTION

Locating and tracking of mobile terminals has attracted a lot of attention during the last years. The development of location technologies has been motivated and fueled by both commercial and non-commercial reasons. Many of the present and future services provided in mobile networks require information about the current location of the mobile terminal, whereby the operators are given an opportunity to increase their revenues by offering these services. Obtaining a reliable estimate of the location of a mobile terminal is also important in terms of public safety, for example. It is highly desirable that certain authorities, such as emergency call centers, are able to locate the mobile terminal accurately. Therefore, different authorities have set requirements for the location determination of mobile terminals.

The need to allow new location-based services to be developed has also been attended to in the standardization work of the 3rd Generation Partnership Project (3 GPP) by defining a general location service (LCS) architecture. FIG. 1 illustrates the general arrangement of the Location Service feature as illustrated in the 3 GPP technical specification TS 23.271 V.6.1.0. As shown in the figure, the external LCS clients 100 access the system through the Gateway Mobile Location Center (GMLC) 101. Generally, the LCS client refers to a software and/or hardware entity that interacts with an LCS Server, which in turn offers LCS capabilities within the Public Land Mobile Network (PLMN) and/or at the service provider. The LCS client is thus a logical functional entity that requests the location information of one or more mobile stations 102. The LCS clients are divided into internal and external clients (from the point of view of the mobile network). An external LCS client may be an application residing in the Internet, for example. Below, an LCS client refers to an external client, if not otherwise stated. The LCS Server in turn is a functional entity comprising the functions needed in GSM or UMTS networks to support location services. The LCS server consists of components that may be distributed to one or more PLMNs and/or service providers. Many of the functions belonging to the LCS server functional group are allocated to the GMLC. An external LCS client thus sees the GMLC as the LCS server.

FIG. 1 illustrates the general arrangement including three types of GMLCs: a requesting GMLC (R-GMLC) 101a, a home GMLC (H-GMLC) 101b, and a visited GMLC (V-GMLC) 101c. The R-GMLC is the GMLC that interacts with the LCS client, the H-GMLC is the home GMLC of the subscriber using the mobile station to be located, and the V-GMLC is a GMLC in the visited network, i.e. the GMLC associated with the serving node of the mobile station to be located. It is to be noted here that the requesting GMLC can be the visited GMLC, which can be the home GMLC at the same time, if the mobile station is in the home network.

The R-GMLC and H-GMLC may request routing information from the Home Location Register (HLR) or from the HSS (Home Subscriber Server) 103. The H-GMLC is responsible for checking the privacy of the mobile station to be located. The privacy check may be performed in the H-GMLC itself or in the Privacy Profile Register (PPR) 104, which is accessible from the H-GMLC.

The R-GMLC receives service requests from the LCS clients. In this context, such a service request, which requests the location of a certain mobile station, is termed an LCS service request. An LCS service request received by a requesting GMLC is forwarded to the visited GMLC via the home GMLC. If the radio access network is the GSM EDGE Radio Access Network (GERAN) 107, the V-GMLC then forwards the request to the Mobile services Switching Centre (MSC) 105 or to the Serving GPRS Support Node (SGSN) 106. On the other hand, if the radio access network is the Universal mobile telecommunication system Terrestial Radio Access Network (UTRAN) 108, the visited GMLC forwards the request to the MCS server 109 or to the SGSN 110 associated with the radio access network.

The actual positioning method is then carried out in the radio access network and the response is returned to the GMLC, i.e. when the subscriber is roaming, the response is returned to the R-GMLC, via the V-GMLC and the H-GMLC.

A drawback relating to the above-described location service is that the SGSN and the MSC/MSC Server are not aware of pure WLAN terminals, i.e. terminals that access the services through the WLAN network only. Therefore, the location information cannot be provided with respect to these terminals.

The objective of the present invention is to eliminate the above-mentioned drawback.

SUMMARY OF THE INVENTION

The objective of the invention is to devise a new mechanism for providing location information regarding mobile terminals, especially for WLAN terminals. Furthermore, the objective of the invention is to devise a mechanism that is highly compatible with (a) the current standards concerning location services in mobile cellular networks and (b) the existing technology, so that minimum changes are needed in the overall system.

In the present invention, a location service request concerning a WLAN terminal is first received and routed by the same entities of the core network that handle location service requests concerning users of a mobile cellular network. However, during the routing process a location service request concerning a WLAN terminal is diverted to a predetermined network element, where the access point currently serving the WLAN terminal is identified. The location information corresponding to the said access point is then determined, and the location information is returned as the location of the terminal. The location of the serving access point thus represents the location of the terminal.

Thus one aspect of the invention is the provision of a method for providing location information in a wireless communication system comprising mobile terminals and at least one access point, each access point being capable of serving the mobile terminals within a service area of the access point, the method comprising the steps of:

in a first network element, receiving a location service request concerning a location of a mobile terminal;

routing the location service request to a predetermined second network element;

in the second network element, identifying the access point currently serving the mobile terminal; and in response to the identifying step, determining location information corresponding to the access point currently serving the mobile terminal, the location information representing the location of the mobile terminal.

In a further aspect the invention provides a system for providing location information in a wireless communication network comprising mobile terminals and at least one access point, each access point being capable of serving the mobile terminals within a service area of the access point, the system comprising:

at least one network element for routing a location service request concerning a location of a mobile terminal to a predetermined network element;

in conjunction with the predetermined network element, identification means for identifying the access point currently serving the mobile terminal; and location determining means, responsive to the identification means, for determining location information corresponding to the access point currently serving the mobile terminal.

In another aspect the invention provides a network element for providing location information in a wireless communication system comprising mobile terminals and at least one access point, each access point being capable of serving the mobile terminals within a service area of the access point, the network element comprising:

reception means for receiving a location service request concerning a location of a mobile terminal, the location service request including an identifier of the mobile terminal; and first means for determining, based on the identifier, an access point currently serving the mobile terminal.

The invention provides a mechanism, which offers standardized location information concerning a WLAN terminal. The invention further provides a mechanism that is highly consistent with the present location service standards and existing WLAN technology, whereby minimum changes are needed to put the invention into practice. This means that the same network elements, i.e. the GMLCs, are utilized as in the above-described RAN-based location process.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIG. 2 to 7 in the appended drawings, wherein.

DETAILED DESCRIPTION OF THE INVENTION

Figure 2:
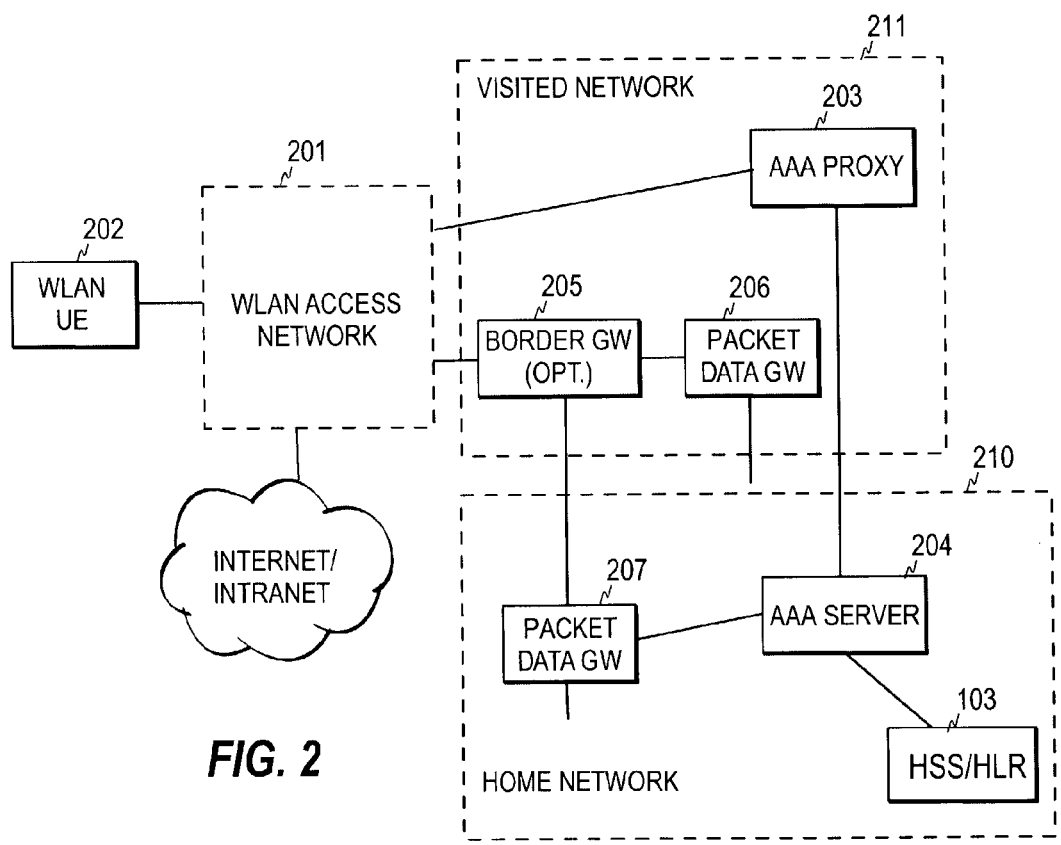
FIG. 2 illustrates a simplified WLAN roaming reference model.

In order to introduce the network elements utilized in the present invention, FIG. 2 first shows a simplified WLAN roaming reference model. This model has been defined in the 3 GPP technical specification TS 23.234 (V1.2.0). According to the reference model, the home network 210 of a WLAN subscriber is responsible for controlling the access of the subscriber (i.e. WLAN terminal 202) to the network. For this purpose, the home network includes a network element termed AAA (Authentication Authorisation Accounting) server 204. This server communicates with an AAA proxy 203 located in the visited network 211. (In the specifications, the AAA server and the AAA proxy are given the prefix "3 GPP", as they are located in 3 GPP networks and contain 3 GPP-specific functionalities.)

The AAA server 204 retrieves authentication information and subscriber profiles from the HSS/HLR 103 and authenticates the subscriber on the basis of the information retrieved. The AAA server further communicates the authorization information to the WLAN network via the AAA proxy. The AAA proxy 203 thus relays the AAA information to the WLAN network and to the AAA server, but it may also reject authorization according to the policy used locally in the visited network. An AAA server may also act as an AAA proxy.

FIG. 2 further shows a Border Gateway 205 and a Packet Data Gateway 206 in the visited network. The Packet Data Gateway is a node via which packet data networks are connected to the WLAN network if user data is routed through a cellular operator's network. The Border Gateway is an optional gateway via which the data can be routed. There is a Packet Data Gateway 207 in the home network as well. The Border Gateway routes user packets to the home or visited network.

Figure 1:
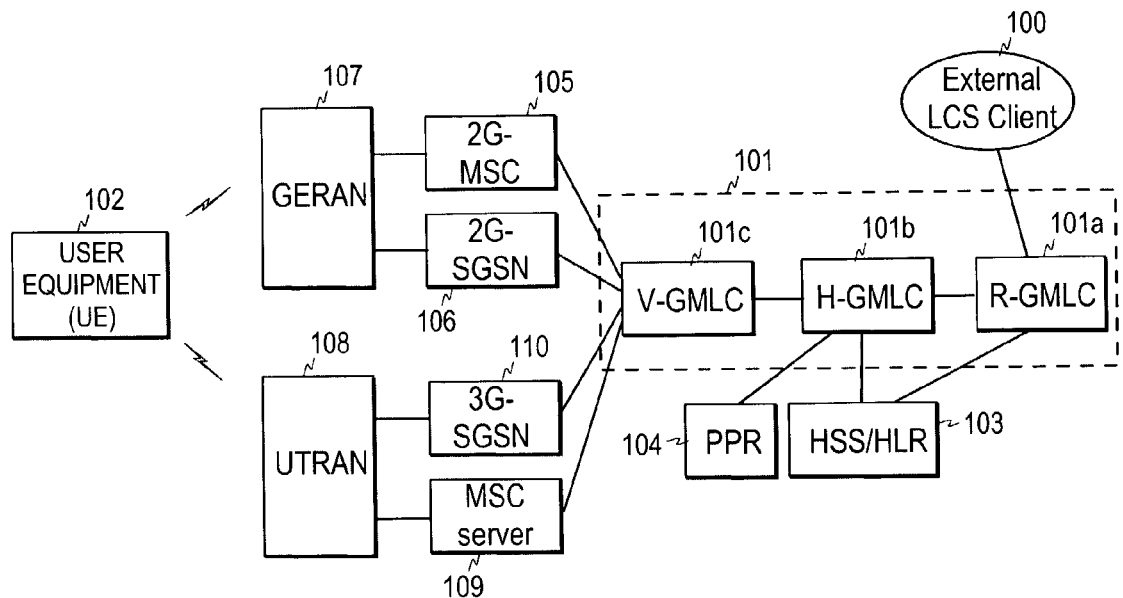
FIG. 1 illustrates a general arrangement of the Location Service feature defined in the 3 GPP specifications.

In the present invention, the AAA proxy is utilized for providing location information indicating the location of a WLAN terminal. The AAA proxy is, due to its role as a network element relaying AAA information, aware of all WLAN terminals accessed to the WLAN network. As discussed below, the AAA proxy of the invention communicates either with the V-GMLC shown in FIG. 1 or with the AAA server shown in FIG. 2.

Figure 3:
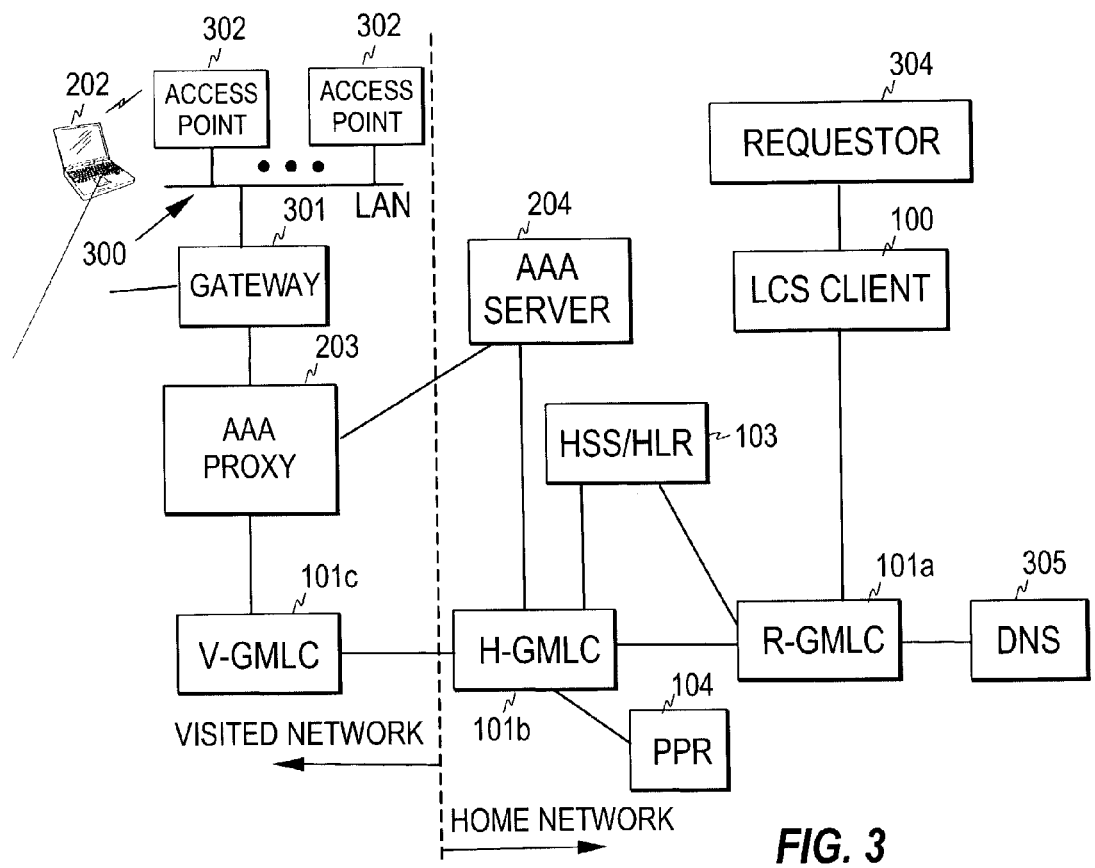
FIG. 3 illustrates a general network architecture according to one embodiment of the invention.
Figure 6:
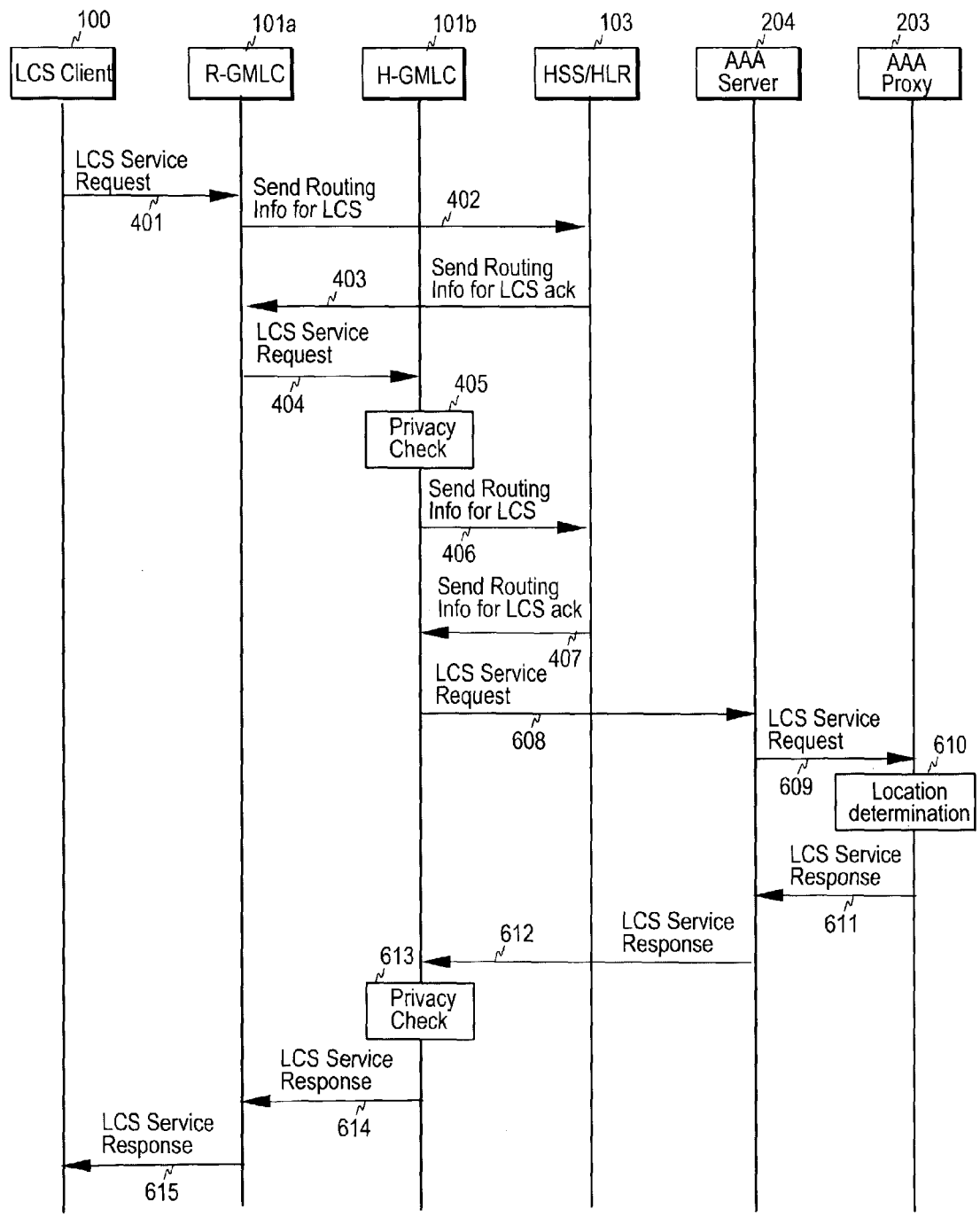
FIG. 6 illustrates the message exchange between the different parties in another embodiment of the invention.
Figure 7:
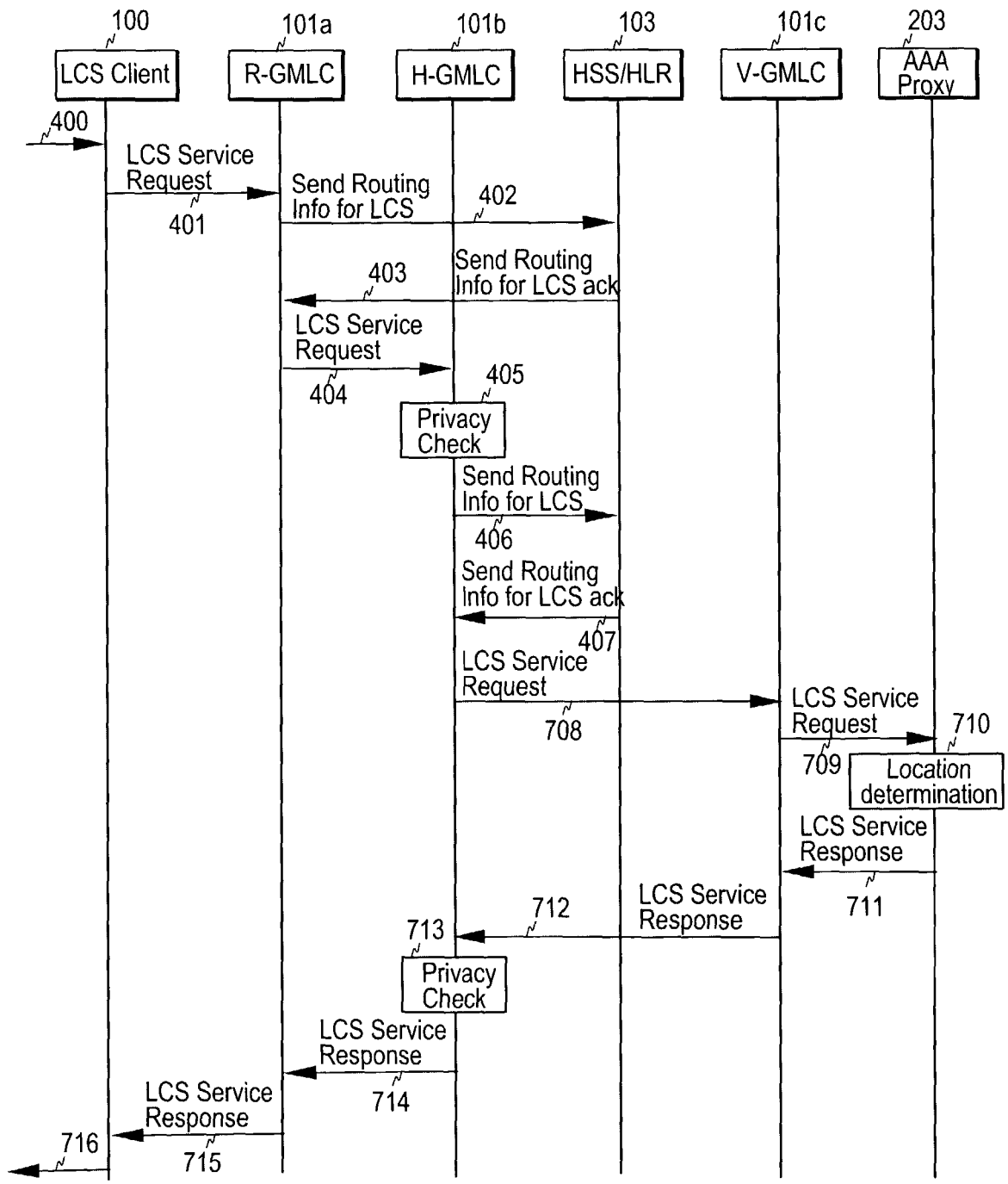
FIG. 7 illustrates the message exchange between the different parties in a still another embodiment of the invention.

FIG. 3 illustrates a general arrangement according to the invention, where the above-described location services are also provided in a WLAN environment. It is to be noted here that FIG. 3 shows only the network elements that are relevant in view of the invention. Consequently, there may be one or more network elements between two adjacent network elements shown in FIG. 3. It is further to be noted that the connections between two network elements in FIG. 3 cover all embodiments discussed below. The network elements actually communicating with each other in each of the embodiments are shown in FIGS. 4, 6, and 7.

The system includes one or more WLAN networks 300, each connected by means of a gateway (a router) 301 to another network, such as the Internet, which contains service providers (not shown). The WLAN network typically comprises a plurality of access points 302, each access point communicating wirelessly with the terminals within its coverage area, i.e. the cell, and thus forming a bridge between the terminals and the wired network. In this context, the coverage area is also called the service area.

In the system of the invention, the V-GMLC 101c interacts with the AAA proxy 203 of the visited network. It is assumed in FIG. 3 that a requestor 304 requests the location of a WLAN terminal 202 from the LCS client 100.

Figure 4:
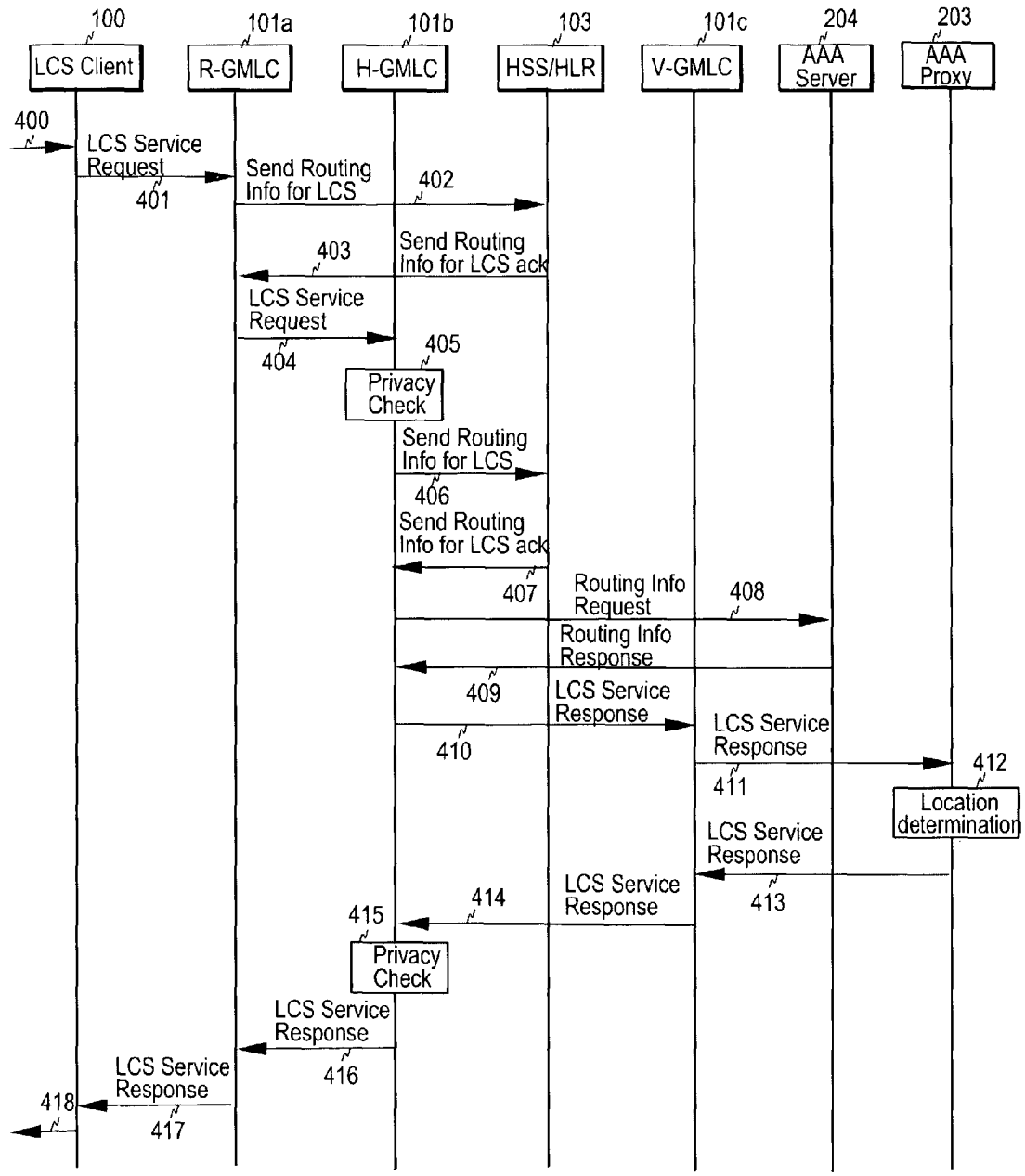
FIG. 4 illustrates the message exchange between the different parties in one embodiment of the invention.

FIG. 4 illustrates the message exchange between the different parties in FIG. 3, when a requestor requests the location of a WLAN terminal 202 from the LCS client. It is to be noted here that a terminal can request its own location, i.e. the requester can also be the terminal itself. The requestor sends a request to the LCS client 100 (step 400). The request typically includes the identities of the requestor and the WLAN terminal, as well as a codeword which indicates that the requestor is authorized to request the location of the WLAN terminal.

In response to the request received from the requestor, the LCS client sends an LCS service request to the R-GMLC 101a, i.e. to the nearest GMLC (step 401). Based on the identity of the WLAN terminal, the R-GMLC knows the address of the HSS/HLR of the WLAN terminal, whereby the R-GMLC is able to request the network address of the H-GMLC of the WLAN terminal from the said HSS (step 402). In response to this request, the HSS/HLR returns the address of the H-GMLC to the R-GMLC (step 403). If available, the HSS/HLR may also return the address of the V-GMLC. Based on the address of the H-GMLC, the R-GMLC forwards the LCS Service Request to the H-GMLC (step 404). On the basis of the identity of the WLAN terminal, the H-GMLC performs a privacy check or asks the PPR 104 to perform the check (step 405) in order to verify whether the said terminal may be located. If this is the case, the H-GMLC asks for routing information from the HSS/HLR (step 406). In response to this request, the HSS/HLR returns the address of the V-GMLC (step 407). The H-GMLC then requests the address of the AAA proxy from the AAA server, in order that the LCS Service Request can be routed correctly (step 408). At this step, the H-GMLC may also request the user identity used in that AAA proxy from the AAA server, in order that the terminal in question can be directly identified in the AAA proxy. It is to be noted here that the HSS knows the address of the AAA server for a given user. However, if there are no more than a few AAA servers in the home network, their addresses can be configured into the H-GMLC, whereby the H-GMLC does not have to query the server address from the HSS.

When the H-GMLC receives the address of the AAA proxy and possibly also the user ID from the AAA server (step 409), it inserts them into the LCS Service Request and sends the said request to the V-GMLC (step 410).

So far the steps shown in FIG. 4 have followed the steps defined in the above-mentioned 3 GPP technical specification TS 23.271, except that the H-GMLC requests the address of the AAA proxy and the user ID used in that proxy from the AAA server (steps 409 and 410) and inserts the said information into the LCS Service Request. It is to be noted here that the above description includes only one example of the process defined in the specification and that the individual steps may vary similarly as disclosed in the said specification. For example, if the H-GMLC receives the address of the V-GMLC from the R-GMLC already at step 403, steps 406 and 407 can be omitted. On the other hand, the R-GMLC may already know the address of the H-GMLC, whereby steps 402 and 403 can be omitted. The R-GMLC may also use other mechanisms to determine the address of the H-GMLC. For example, the R-GMLC may contact a Domain Name Server (DNS) 305 shown in FIG. 3 in order to get the network address of the H-GMLC.

To sum up the process so far, the LCS Service Request is routed in accordance with the mechanisms defined in the current specifications until the request reaches the GMLC of the visited network. In addition, the address of the AAA proxy, and possibly also the user ID used in that proxy, are found out during the routing process, and inserted into the LCS Service Request sent to the V-GMLC, in order to enable the V-GMLC to correctly route the LCS Service Request, which now concerns a WLAN terminal instead of a mobile phone, and to enable the AAA proxy to directly identify the terminal in question.

Based on the address of the AAA proxy included in the request, the V-GMLC then sends the LCS Service Request to the AAA proxy 203 of the visited network (step 411). Upon receiving the LCS Service Request, the AAA proxy initiates a location determination process that is discussed in more detail in connection with FIG. 5. In this process (step 412), the AAA proxy determines the identity and location of the access point 302 serving the WLAN terminal to be located. In the present invention, the WLAN terminal is thus located based on the location of the serving access point. As the range of a WLAN cell is typically a few tens of meters, the accuracy obtained in this way is very good. Moreover, no modifications are needed in the WLAN devices, terminals, or access points, as the terminals do not have to provide any assistance in the positioning process, and as there is no need for the WLAN access network operator to perform any measurements to locate the terminal.

The AAA proxy then returns the location information to the V-GMLC in an LCS Service Response (step 413). The location information is preferably in the same format as the location information returned in the RAN-based location system of FIG. 1. The V-GMLC sends the LCS Service Response back to the H-GMLC, which may perform a new privacy check, if the privacy check performed previously (step 405) indicated that a further check is needed. The previous check may for example indicate that the privacy of the subscriber depends on the location and therefore a new check has to be made at step 415.

The H-GMLC then sends the LCS Service Response to the R-GMLC (step 416), which forwards the response to the LCS client (step 417). As in the RAN-based location, the R-GMLC may first transform the universal coordinates into a local geographic system, if the LCS client so desires. The LCS client then sends the results to the requester (step 418).

As illustrated above, in the present invention the LCS client obtains the location of a WLAN terminal in the same way as in the case of cellular phones. Moreover, the internal mechanism that is used to determine the location is highly compatible with the present standards and does not require changes in the terminals to be located.

Although the identity of the WLAN terminal to be located must be transferred from the requestor to the element that determines the identity of the serving access point, i.e. to the AAA proxy, it is to be noted here that various identifiers may be used to identify the WLAN terminal and the type of the identifier used may change in one of the above-described network elements. The identifiers that may be used to identify the WLAN terminal include:

- An identifier on which the authentication in the WLAN network is based, such as the Network Access Identifier (NAI). The NAI is the identifier submitted by a WLAN terminal during the authentication process in the WLAN environment. In other words, the operation of the AAA server is based on the NAI.
- International Mobile Subscriber Identity (IMSI). If the IMSI is used as such, it is preferable to use a secure connection for transferring the IMSI.
- WLAN temporary identity (pseudonym). This temporary ID may be encrypted.

Mobile Subscriber International ISDN Number (MSISDN). Although this is the directory number of a mobile subscriber, it could also be used for identifying WLAN terminals.

An identifier that is LCS-specific, i.e. an identifier that is used for the location service only.

Currently, the IMSI and the MSISDN are the only identifiers that can be used when requesting information from the HSS/HLR. However, it is possible that further identifiers, like the IMS public identities as defined in 3 GPP specification 23.228, may be used in the future with the HSS/HLR and location services. Even though the R-GMLC and the H-GMLC must currently use the IMSI or the MSISDN when communicating with the HSS/HLR, they may use an identifier of another type when communicating in another direction. Therefore, if an identifier of another type is used between the LCS client and the R-GMLC to identify the WLAN terminal to be located, the R-GMLC must be able to transform such an identifier into the IMSI or MSISDN of the WLAN terminal to be located. Moreover, the H-GMLC may transform the IMSI or the MSISDN to an identifier of another type for the LCS Service Request to be transmitted to the V-GMLC. For example, if the R-GMLC maps a service-specific identifier received from the LCS client to the IMSI or MSISDN, the H-GMLC may again map the said IMSI or MSISDN to the same service-specific identifier for the LCS Service Request to be transmitted to the V-GMLC. As discussed above, the translation of the identifier may also be performed by retrieving the identifier used by the AAA proxy from the AAA server and by using this identifier thenceforward.

Various encryption mechanisms may also be utilized when transferring the identity of the WLAN terminal over a public network, such as the Internet.

Figure 5:
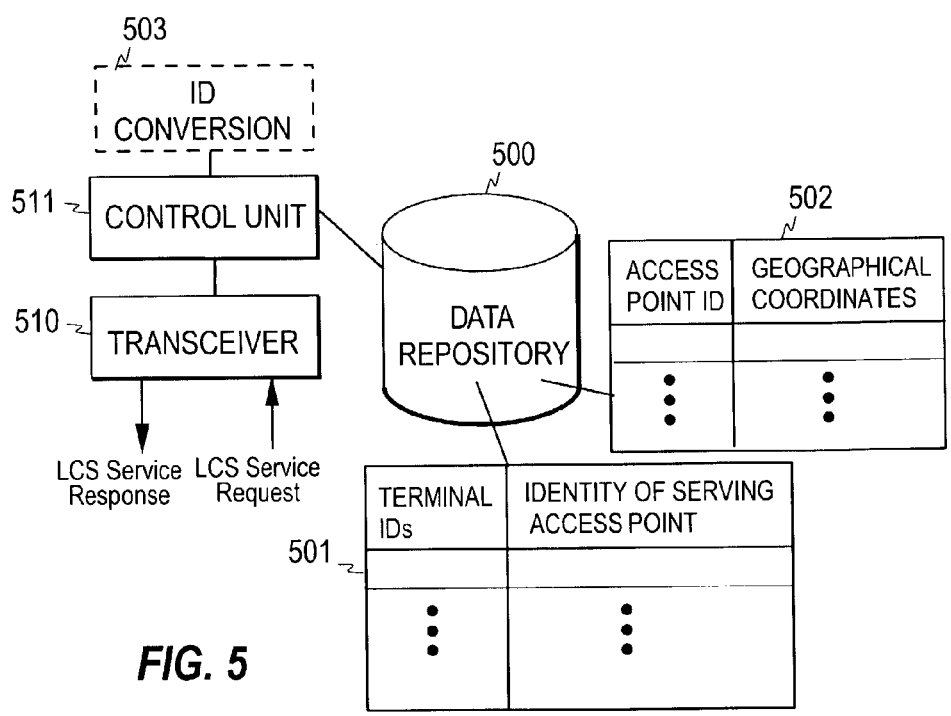
FIG. 5 illustrates the AAA proxy of the invention.

FIG. 5 is a schematic illustration of the AAA proxy of the invention. Due to its role as a network element relaying AAA information between the WLAN network and the AAA server in the home network, the AAA proxy is aware of all the terminals that have accessed the WLAN network in question, and also of the identity of the serving access point corresponding to each terminal.

These features are utilized in the present invention by providing the AAA proxy with a data repository 500 that includes metadata that describes the relationship between the WLAN terminal identity and the geographical coordinates of the access point serving the terminal. The metadata may be in the form of two tables, for example, wherein the first table 501 indicates, which one of a plurality of access points is the serving access point for each terminal, and the second table 502 indicates the geographical coordinates of each access point. The repository and the AAA proxy may also be operated by different operators, i.e. the repository may reside in the premises of the WLAN operator.

When the AAA proxy receives an LCS Service Request, it determines the identity of the serving access point on the basis of the terminal ID received in the said request. Based on the identity, the AAA proxy then retrieves the geographical coordinates of the serving access point. FIG. 4 further shows a transceiver unit 510, which receives the requests and transmits the responses, and a control unit 511, which extracts the terminal ID from the requests and controls the above operation.

As is obvious, the metadata that maps the terminal identity to the location information of the serving access point may be in other formats as well. If the V-GMLC sends a different type of terminal identifier than what is used in the WLAN environment by the AAA proxy, the AAA proxy may also include a conversion unit 502 for the conversion of identifiers.

In another embodiment of the invention, the LCS Service Request is routed through the AAA server to the AAA proxy. As illustrated in FIG. 6, in this embodiment the H-GMLC forwards the LCS Service Request to the AAA server that resides in the same network as the H-GMLC (step 608). Based on the identity of the terminal, the AAA server retrieves the address of the corresponding AAA proxy and forwards the request to the AAA proxy, which then operates in the manner described above. The LCS Service Request is returned along the same path, as shown in FIG. 6.

In still another embodiment of the invention, the H-GMLC receives the address of the AAA proxy from the HSS/HLR. This embodiment is illustrated in FIG. 7. In this case, the address of the AAA proxy is thus received, together with the address of the V-GMLC, from the HSS/HLR at step 407. When the H-GMLC receives this address from the HSS/HLR, it inserts the address into the LCS Service Request and sends the said request to the V-GMLC and the process continues as illustrated in connection with FIG. 4. In other words, steps 708 to 715 in FIG. 7 correspond, respectively, to steps 410 to 417 in FIG. 4.

In the above examples, the AAA proxy determined the position of the identified WLAN terminal as related to the location of the corresponding serving Access Point and indicated the position as geographical coordinates in the response message to V-GMLC. However, it is also possible that the AAA proxy only identifies the serving access point and returns the access point identity to the V-GMLC or to the AAA server. The V-GMLC or the AAA server may then convert the access point identity into geographical coordinates. A separate network entity connected to the V-GMLC or to the AAA server may also perform the conversion. It is also possible that the access point identifier is inserted into the LCS Service Response and the conversion is performed later in the H-GMLC, in the R-GMLC, or in the LCS client (or in a separate network entity connected to one of said elements).

In the embodiments of FIG. 7, the routing of the LCS Service Request is based on the address of the AAA proxy being stored in the HSS/HLR. This address may be stored in advance by the AAA server in response to the authentication process when the terminal joins the WLAN network of the AAA proxy. The address of the AAA proxy may also be fetched by another element, such as the R-GMLC.

It is also possible that the LCS Service Request includes an identifier that indicates when the request has to be routed to the AAA proxy, rather than to the MSC or SGSN. This identifier may be the identifier of the WLAN terminal, if the latter differs from the identifiers of the mobile terminals to be located by the radio access network.

The position of the WLAN terminal as determined by the location of the serving access point may be made more accurate by adding a WLAN radio measurement to the above-described method. Thus, in this case the AAA proxy may request, upon receiving the LCS Service Request, a radio signal measurement from the WLAN access network, in order to estimate the location of the terminal within the service area of the serving access point. When the WLAN access network returns the results of the measurement, the AAA proxy may improve the accuracy of the system by correcting the location of the serving access point by means of the results of the radio signal measurement.

Although the invention was described above with reference to the examples shown in the appended drawings, it is obvious that the invention is not limited to these, but may be modified by those skilled in the art without departing from the scope and spirit of the invention. For example, the type of the WLAN networks may vary: the WLAN network may be compatible with the IEEE 802.11 standard or the BRAN (Broadband Radio Access Networks) standard, for example. Furthermore, the terminals do not have to be wireless terminals, but the method can also be used for providing location information for roaming users with fixed connections.

The invention claimed is:

1. A method, comprising:
   receiving a location service request for location of a mobile terminal configured to operate within a wireless local area network;
   determining to route the location service request to a network element of a home network, configured to identify an access point of the wireless local area network;
   determining, based on the identified access point, location of the access point currently serving the mobile terminal in the wireless local area network; and
   determining to transmit, from the home network, location information specifying the determined location to a mobile cellular network via either a serving support node or a mobile services switching center in response to the location service request from the mobile cellular network,
   wherein the determining the location of the access point is performed in an authentication, authorization, and accounting proxy based upon an identification of the mobile terminal in the location service request, and
   wherein the location of the access point indicates geographical coordinates of the access point currently serving the mobile terminal.

2. The method according to claim 1, wherein the mobile terminal is a wireless local area network only terminal.

3. The method according to claim 1, wherein the access point is identified in an authentication, authorization, and accounting proxy and the determining the location of the access point in another network element.

4. The method according to claim 3, wherein said other network element is a gateway mobile location center operably connected to the mobile cellular network for providing location information concerning users within the mobile cellular network.

5. The method according to claim 1, further comprising inserting an address of another network element into the location service request.

6. The method according to claim 5, wherein the determining to route the location service request includes retrieving the address from a third network element.

7. The method according to claim 6, wherein the third network element is configured to provide authentication, authorization, and accounting.

8. The method according to claim 5, further comprising determining to store the address in a fourth network element containing subscriber profiles, whereby the determine to route the location service request includes retrieving the address from the fourth network element.

9. The method according to claim 8, wherein the different network element is a home location register/home subscriber server.

10. The method according to claim 1, further comprising:
    determining to update the location of the access point by using wireless local area network radio measurements within the service area of the access point currently serving the mobile terminal; and
    determining to correct the location of the mobile terminal using the updated location of the access point.

11. The method of claim 1, wherein the support node is a general packet radio service support node.

12. The method of claim 1, wherein the wireless local area network includes at least one access point through which services are accessible.

13. A system, comprising:
    a network element configured to route a location service request to a network element of a home network, wherein the network element is configured to identify an access point of a wireless local area network; and
    a location determining unit configured to determine location of the access point in the wireless local area network based on the identified access point,
    wherein the determined location is transmitted from the home network to a mobile cellular network via a serving support node or a mobile services switching center in response to the location service request from the mobile cellular network,
    wherein the determining the location of the access point is performed in an authentication, authorization, and accounting proxy based upon an identification of the mobile terminal in the location service request, and
    wherein the location of the access point indicates geographical coordinates of the access point currently serving the mobile terminal.

14. The system according to claim 13, wherein the location determining unit is located in conjunction with the predetermined network element.

15. The system of claim 13, wherein the support node is a general packet radio service support node.

16. An apparatus, comprising:
    at least one processor; and
    at least one memory including computer program code,
    the at least one memory and the computer program code configured to, with the at least one processor, cause the apparatus to perform at least the following,
    receive a location service request for location of a mobile terminal configured to operate within a wireless local area network;
    determine to route the location service request to a network element of a home network, configured to identify an access point of the wireless local area network;
    determine, based on the identified access point, the location of the access point currently serving the mobile terminal in the wireless local area network; and
    determine to transmit, from the home network, location information specifying the determined location to a mobile cellular network via either a serving support node or a mobile services switching center, in response to the location service request from the mobile cellular network,
    wherein the determine the location of the access point is performed in an authentication, authorization, and accounting proxy based upon an identification of the mobile terminal in the location service request, and
    wherein the location of the access point indicates geographical coordinates of the access point currently serving the mobile terminal.

17. The apparatus according to claim 16, wherein the mobile terminal is a wireless local area network only terminal.

18. The apparatus according to claim 17, wherein the location of the access point includes geographical coordinates of the access point.

19. The apparatus according to claim 16, wherein the location of the access point includes geographical coordinates.

20. The apparatus of claim 16, wherein the support node is a general packet radio service support node.

21. A method, comprising:
receiving at a mobile services switching center a physical location of an access point of a wireless local area network currently serving a mobile terminal operably connected to the wireless local area network via the access point, the physical location of the access point being determined by an authentication, authorization, and accounting proxy connected to the wireless local area network where the access point currently serving the mobile terminal resides; and
determining to transmit, from a home network, by the mobile services switching center to a mobile cellular network the received location as a current physical location of the mobile terminal, in response to a location service request from the mobile cellular network,
wherein the determining the location of the access point is performed in an authentication, authorization, and accounting proxy based upon an identification of the mobile terminal in the location service request, and
wherein the location of the access point indicates geographical coordinates of the access point currently serving the mobile terminal.

22. The method according to claim 21, further comprising:
determining to update the physical location of the access point by using wireless local area network radio measurements within the service area of the access point currently serving the mobile terminal; and
determining to correct the physical location of the mobile terminal using the updated physical location of the access point.

23. A method, comprising:
receiving at a serving support node a physical location of an access point of a wireless local area network currently serving a mobile terminal operably connected to the wireless local area network via the access point, the physical location of the access point being determined by an authentication, authorization, and accounting proxy connected to the wireless local area network where the access point currently serving the mobile terminal resides; and
determining to transmit, from a home network, by the serving support node to a mobile cellular network the received location as a current physical location of the mobile terminal, in response to a location service request from the mobile cellular network,
wherein the determining the location of the access point is performed in an authentication, authorization, and accounting proxy based upon an identification of the mobile terminal in the location service request, and
wherein the location of the access point indicates geographical coordinates of the access point currently serving the mobile terminal.

24. The method according to claim 23, further comprising:
determining to update the physical location of the access point by using wireless local area network radio measurements within the service area of the access point currently serving the mobile terminal; and
determining to correct the physical location of the mobile terminal using the updated physical location of the access point.

25. The method of claim 23, wherein the support node is a general packet radio service support node.

26. A method, comprising:
receiving a location service request for location of a mobile terminal configured to operate within a wireless local area network;
determining to route the location service request to a network element of a home network, configured to identify an access point of the wireless local area network;
determining, based on the identified access point, location of the access point currently serving the mobile terminal in the wireless local area network; and
determining to transmit, from the home network, location information specifying the determined location to a mobile cellular network via either a serving support node or a mobile services switching center in response to the location service request from the mobile cellular network,
wherein the access point is identified in an authentication, authorization, and accounting proxy and the determining the location of the access point in another network element, and
wherein said other network element is a gateway mobile location center operably connected to the mobile cellular network for providing location information concerning users within the mobile cellular network.

27. A system, comprising:
a network element configured to route a location service request to a network element of a home network, wherein the network element is configured to identify an access point of a wireless local area network; and
a location determining unit configured to determine location of the access point in the wireless local area network based on the identified access point,
wherein the determined location is transmitted from the home network to a mobile cellular network via a serving support node or a mobile services switching center in response to the location service request from the mobile cellular network,
wherein the access point is identified in an authentication, authorization, and accounting proxy and the determining the location of the access point in another network element, and
wherein said other network element is a gateway mobile location center operably connected to the mobile cellular network for providing location information concerning users within the mobile cellular network.

28. An apparatus, comprising:
at least one processor; and
at least one memory including computer program code,
the at least one memory and the computer program code configured to, with the at least one processor, cause the apparatus to perform at least the following,
receive a location service request for location of a mobile terminal configured to operate within a wireless local area network;
determine to route the location service request to a network element of a home network, configured to identify an access point of the wireless local area network;
determining, based on the identified access point, the location of the access point currently serving the mobile terminal in the wireless local area network; and
determine to transmit, from the home network, location information specifying the determined location to a mobile cellular network via either a serving support node or a mobile services switching center, in response to the location service request from the mobile cellular network, wherein the access point is identified in an authentication, authorization, and accounting proxy and the determining the location of the access point in another network element, and wherein said other network element is a gateway mobile location center operably connected to the mobile cellular network for providing location information concerning users within the mobile cellular network.

29. A method, comprising:

receiving at a mobile services switching center a physical location of an access point of a wireless local area network currently serving a mobile terminal operably connected to the wireless local area network via the access point, the physical location of the access point being determined by an authentication, authorization, and accounting proxy connected to the wireless local area network where the access point currently serving the mobile terminal resides; and determining to transmit, from a home network, by the mobile services switching center to a mobile cellular network the received location as a current physical location of the mobile terminal, in response to a location service request from the mobile cellular network, wherein the access point is identified in an authentication, authorization, and accounting proxy and the determining the location of the access point in another network element, and wherein said other network element is a gateway mobile location center operably connected to the mobile cellular network for providing location information concerning users within the mobile cellular network.

* * * * *